(12) United States Patent
Herman

(10) Patent No.: US 7,237,789 B1
(45) Date of Patent: Jul. 3, 2007

(54) DETACHABLE AXLE AND HITCH ASSEMBLY

(76) Inventor: Anthony Herman, 15 EMS B20CI La., Pierceton, IN (US) 46582

(*) Notice: Subject to any disclaimer, the term of this patent is extended or adjusted under 35 U.S.C. 154(b) by 112 days.

(21) Appl. No.: 11/073,191

(22) Filed: Mar. 4, 2005

(51) Int. Cl.
B60D 1/00 (2006.01)
B62D 53/00 (2006.01)

(52) U.S. Cl. .............. 280/476.1; 280/405.1; 280/490.1

(58) Field of Classification Search ............. 280/405.1, 280/476.1, 483–485, 489, 490.1, 493, 494, 280/679, 684
See application file for complete search history.

(56) References Cited

U.S. PATENT DOCUMENTS

| | | | | |
|---|---|---|---|---|
| 3,476,405 | A | * | 11/1969 | Cunha .................. 280/476.1 |
| 3,870,340 | A | * | 3/1975 | Winter .................. 280/418.1 |
| 3,888,515 | A | * | 6/1975 | Winter .................. 280/476.1 |
| 4,390,192 | A | | 6/1983 | Wagner |
| 4,423,885 | A | | 1/1984 | Camey et al. |
| 4,472,100 | A | | 9/1984 | Wagner |
| 5,303,946 | A | * | 4/1994 | Youmans et al. ........ 280/405.1 |
| 5,378,010 | A | * | 1/1995 | Marino et al. ........ 280/124.107 |
| 5,607,176 | A | * | 3/1997 | Leib et al. ............... 280/656 |
| 5,727,804 | A | | 3/1998 | Metzger |
| 6,224,083 | B1 | | 5/2001 | Tyler |
| 6,273,447 | B1 | | 8/2001 | Berg |

* cited by examiner

Primary Examiner—Lesley D. Morris
Assistant Examiner—Marc A Scharich
(74) Attorney, Agent, or Firm—Botkin & Hall, LLP

(57) ABSTRACT

A hitch and axle assembly including a support structure detachably securable to a vehicle and an axle assembly. A hitch is mountable on the support structure. The axle assembly includes a primary axle member defining a primary axis. Torsion beam assemblies are coupled to opposite lateral sides of the primary axle member. The torsion beam assemblies each include a torsion member that extends substantially coincident with the primary axis and a lever arm that extends substantially transversely from the torsion member. Wheel assemblies are mounted on a distal portion of the lever arms wherein the wheel assemblies each define an axis of rotation that is parallel and spaced from the primary axis. The two wheel axes are substantially coincident. The torsion bar assemblies may be rotationally adjustable relative to the primary axle to thereby provide for the vertical adjustment of the wheel assemblies.

13 Claims, 5 Drawing Sheets

US 7,237,789 B1

DETACHABLE AXLE AND HITCH ASSEMBLY

BACKGROUND OF THE INVENTION

1. Field of the Invention

The present invention relates to vehicles having a towing hitch and, more specifically, to an axle and hitch assembly that can be attached to an existing vehicle.

2. Description of the Related Art

It is known in the art to use a trailer dolly with a trailer when towing a trailer having a significant tongue weight. Such trailer dollies provide support for the trailer tongue and limit the load placed on the rear axle of the tow vehicle.

Pickup trucks are oftentimes used as tow vehicles. When the pickup truck is not being used as a tow vehicle it may be used to haul items in its truck bed. While a conventional trailer dolly is useful for supporting a trailer tongue load that would otherwise be placed on the rear axle of the pickup truck, such trailer dollies are not typically adapted to help support a load placed on the bed of the pickup truck.

Various other apparatus have also been developed that can be used to at least partially support the load of a pickup truck. Examples of such apparatus include U.S. Pat. No. 5,727,804 and U.S. Pat. No. 6,224,083. Such apparatus, however, may increase the overall length of the truck or require installation in the bed of the truck, either of which may possibly interfere with the operation of the truck.

An improved apparatus that can be used with a pickup truck or other tow vehicle to increase the tongue weight that can be placed on the truck by a trailer and which may also be used to increase the capacity of the truck with regard to the load in its truck bed is desirable.

SUMMARY OF THE INVENTION

The present invention provides a hitch and axle assembly that can be detachably secured to a vehicle to thereby facilitate the towing of trailer with a significant tongue weight and which is also useful to increase the load capacity of the vehicle in the absence of an attached trailer.

The invention comprises, in one form thereof, a hitch and axle assembly adapted for use with a vehicle and which includes a support structure detachably securable to the vehicle, a hitch mounted on said support structure, and an axle assembly. The axle assembly includes a primary axle member extending laterally from a first lateral side of the support structure to an opposite second lateral side of the support structure and defines a primary axis. A first torsion beam assembly is coupled to the primary axle member on the first lateral side. The first torsion bar assembly includes a first torsion member that extends substantially coincident with the primary axis and a first lever arm that extends substantially transversely from the first torsion member. A first wheel assembly is mounted on a distal portion of the first lever arm wherein the first wheel assembly defines a first axis of rotation that is parallel and spaced from the primary axis. A second torsion beam assembly is coupled to the primary axle member on the second lateral side. The second torsion beam assembly includes a second torsion member that extends substantially coincident with the primary axis and a second lever arm that extends substantially transversely from the second torsion member. A second wheel assembly is mounted on a distal portion of the second lever arm wherein the second wheel assembly defines a second axis of rotation that is parallel and spaced from the primary axis. The first and second axes of rotation defined by the first and second wheel assemblies are substantially coincident.

In alternative embodiments of the invention, the first and second torsion beam assemblies are each rotationally adjustably coupled to the primary axle member. Rotational adjustment of the first and second torsion beam assemblies rotates the first and second lever arms respectively and thereby selectively adjusts a vertical distance between the primary axis and the first and second axes of rotation. This allows the wheels to be easily adjusted to properly engage the ground surface after the apparatus has been secured to a vehicle.

BRIEF DESCRIPTION OF THE DRAWINGS

The above mentioned and other features of this invention, and the manner of attaining them, will become more apparent and the invention itself will be better understood by reference to the following description of an embodiment of the invention taken in conjunction with the accompanying drawings, wherein.

Figure 1:
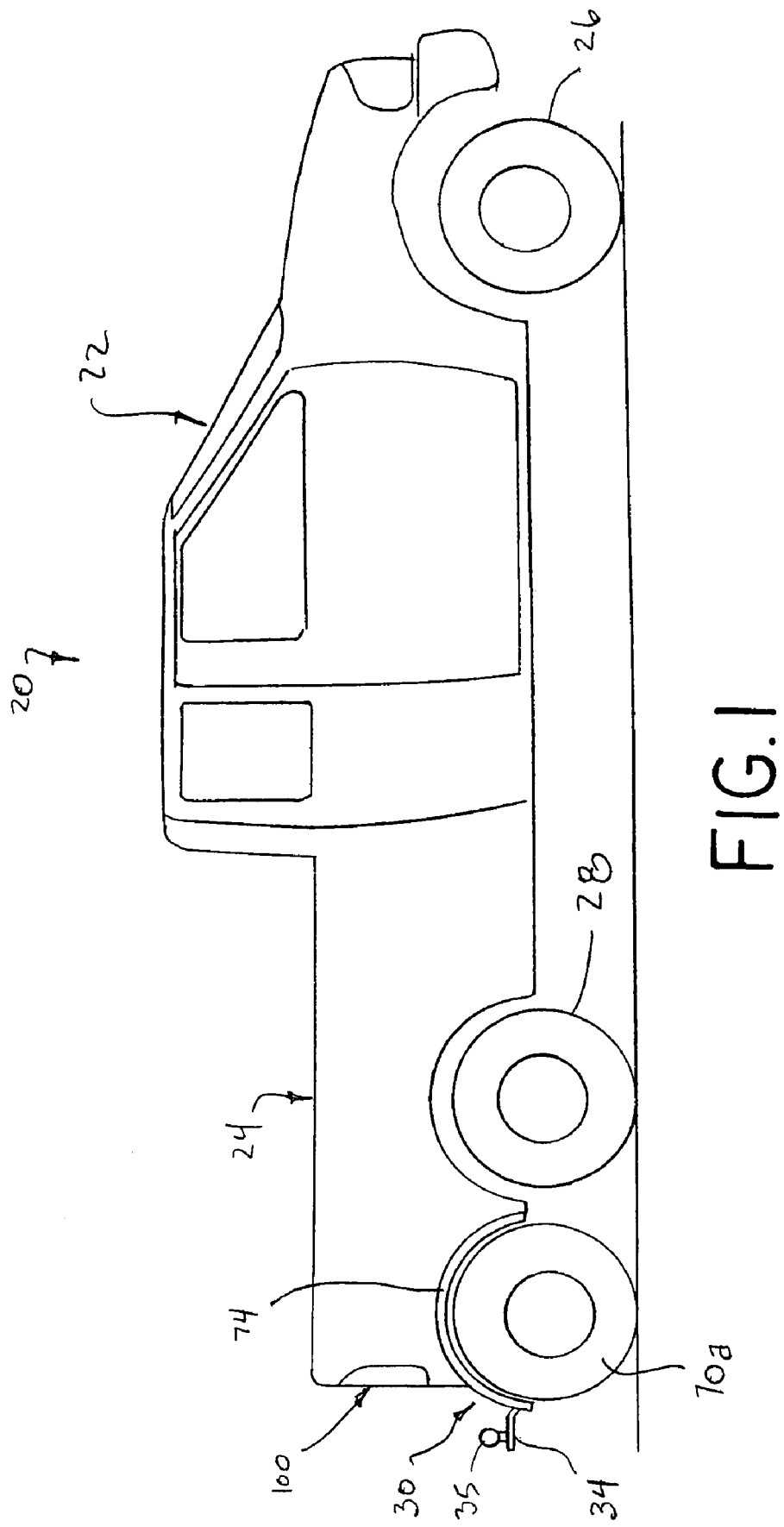
FIG. 1 is a side view of a pickup truck with an attached hitch and axle assembly.

Corresponding reference characters indicate corresponding parts throughout the several views. Although the exemplification set out herein illustrates an embodiment of the invention, in one form, the embodiment disclosed below is not intended to be exhaustive or to be construed as limiting the scope of the invention to the precise form disclosed.

DETAILED DESCRIPTION OF THE INVENTION

Figure 2:
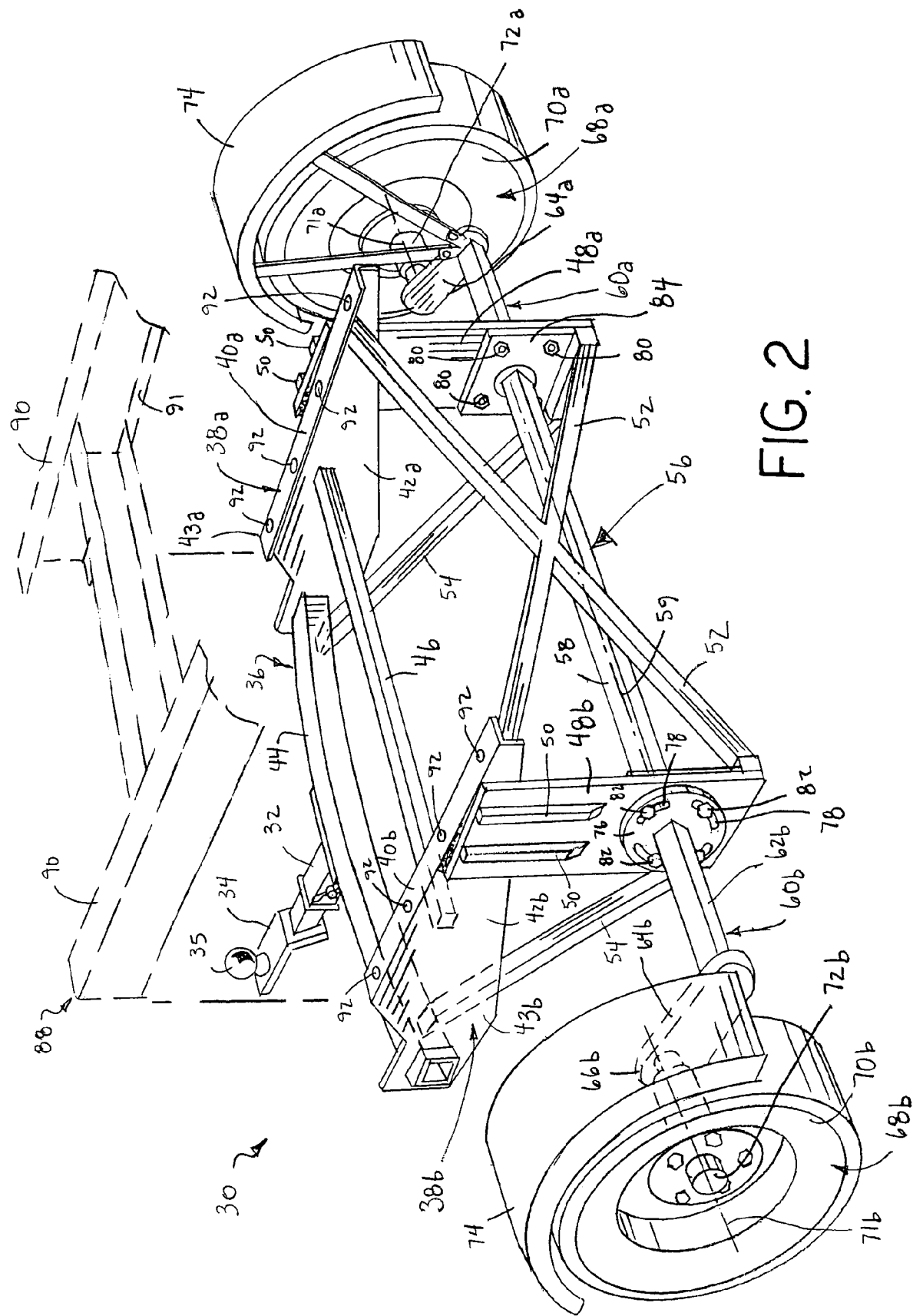
FIG. 2 is a perspective view of the hitch and axle assembly.

A pickup truck 20 that can be used with the present invention is shown in FIG. 1. Truck 20 is a conventional pickup truck and includes a cab 22, a truck bed 24, a front axle 26 and a rear axle 28. A hitch and axle assembly 30 is attached to truck 20 and is best seen in FIG. 2.

Assembly 30 includes a hitch mounting tube 32 in which a hitch member 34 is removably mounted. Hitch mounting tube 32 has a standard construction well known to those having ordinary skill in the art. Mounting tube 32 receives a conventional hitch member 34 having a standard ball hitch 35. Ball hitch 35 can be engaged with the tongue of a trailer, recreational vehicle or other mobile structure that is to be towed. Customized hitch members may also be received in hitch mounting tube 32 to tow trailers which are not engageable with a standard ball hitch.

Hitch mounting tube 32 is supported by and extends rearwardly from support structure 36. Support structure 36 includes first and second longitudinal members 38*a*, 38*b*, rear lateral member 44, intermediate lateral member 46, structural plates 48*a*, 48*b*, laterally extending bracing members 52 and longitudinally extending bracing members 54 which are all welded together to form rigid support frame. First and second longitudinal members 38*a*, 38*b* are each formed of a structural steel plate and include upper flanges 40*a*, 40*b* and vertical webs 42*a*, 42*b* respectively. In the illustrated embodiment, first longitudinal member 38*a* defines a first lateral side 43*a* of support structure 36 while second longitudinal member 38b defines a second lateral side 43b of support structure 36. Structural members 44, 46, 52 and 54 are all structural steel tubes. Structural plates 48a, 48b each include stiffening ribs 50 formed of steel plate and welded to plates 48a, 48b.

Assembly 30 also includes an axle assembly 56 which supports the load transferred from hitch mounting tube 32 to support structure 36. Axle assembly 56 includes a primary axle member 58 and first and second torsion beam assemblies 60a, 60b. Primary axle member 58 defines a laterally extending primary axis 59 and extends between the opposite lateral sides 43a, 43b of support structure 36. Primary axle member 58 is a structural steel tube which extends with clearance through inner mounting plates 84 which are, in turn, welded to the inward facing surfaces of structural plates 48a, 48b.

Torsion beam assemblies that can be used to provide a suspension mechanism for a wheel assembly are known to those having ordinary skill in the art and assemblies 60a, 60b have a conventional construction. Torsion beam assemblies 60a, 60b each include a torsion member 62a, 62b and a lever arm 64a, 64b. Torsion members 62a, 62b form the end portions of primary axle member 58 and extend in alignment, or coincidentally, with primary axis 59. Lever arms 64a, 64b extend transversely to primary axis 59 and have wheel assemblies 68a, 68b respectively coupled to their distal ends 66a, 66b.

Each of the wheel assemblies 68a, 68b include a wheel hub assembly 72a, 72b that extends laterally outwardly from its associated lever arm 64a, 64b and has a wheel 70a, 70b mounted thereon. Fenders 74 are mounted on torsion beam assemblies 60a, 60b and cover the top of wheels 70a, 70b which, in the illustrated embodiment, are conventional automobile tires. The wheel assemblies 68a, 68b each respectively define a rotational axis 71a, 71b which are oriented parallel to primary axis 59 but longitudinally spaced therefrom. The rotational axes 71a, 71b are substantially aligned, i.e., coincident, with each other.

Mounting plates 76 are used to rotationally adjustably attach torsion beam assemblies 60a, 60b to structural plates 48a, 48b. Mounting plates 76 are formed of structural steel plate with torsion members 62a, 62b are welded thereto. Mounting plates 76 also have arcuate slots 78 located therein. Slots 78 are located at a common radial distance from primary axis 59 and extend circumferentially through an arc of approximately 20-30 degrees. The shaft of bolts 82 extend through slots 78 and are secured with bolts on the laterally inner surface of mounting plates 84. Slots 78 allow torsion beam assemblies 60a, 60b to be rotated about axis 59 by loosening nuts 84, adjustably rotating assemblies 60a, 60b to their desired rotational positions, and then securing assemblies 60a, 60b in place by tightening nuts 84. Mounting plates 76 also serve to secure primary axle member 58 against longitudinal movement relative to structural plates 48a and 48b.

Figure 4:
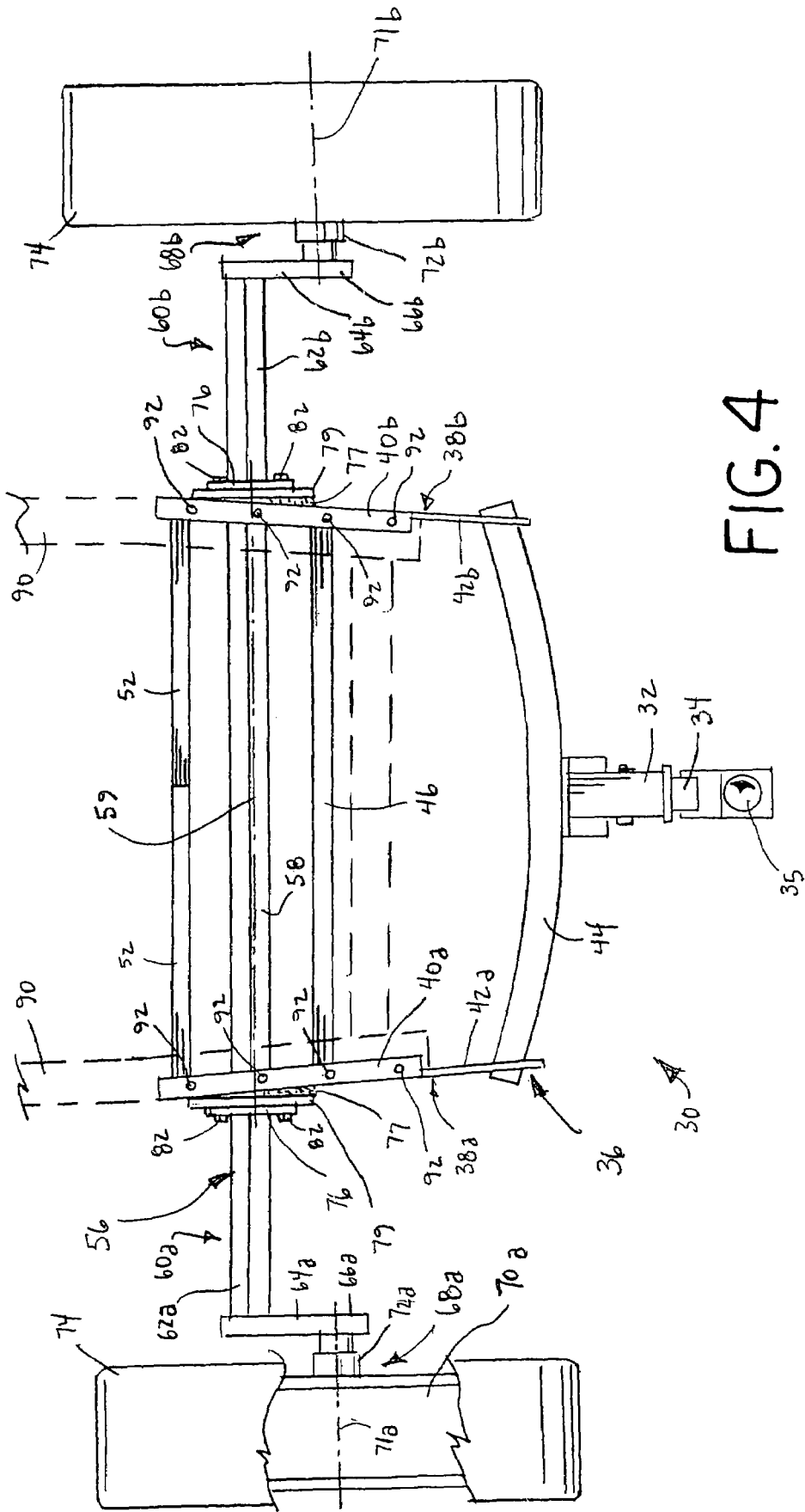
FIG. 4 is a top view of the hitch and axle assembly.

As best seen in FIG. 4, longitudinal members 38a, 38b and, consequently, attached structural plates 48a, 48b, extend in a substantially longitudinal direction but are not at a precise 90 degree angle relative to primary axis 59. Thus, shims 77 are used to position bearing plates 79 at a 90 degree angle relative to primary axis 59. Shims 77 and bearing plates 79 are securely welded to structural plates 48a, 48b and bearing plates 79 provide a surface against which mounting plates 76 can rotate while retaining torsion members 60a, 60b in alignment with primary axis 59.

Figure 3:
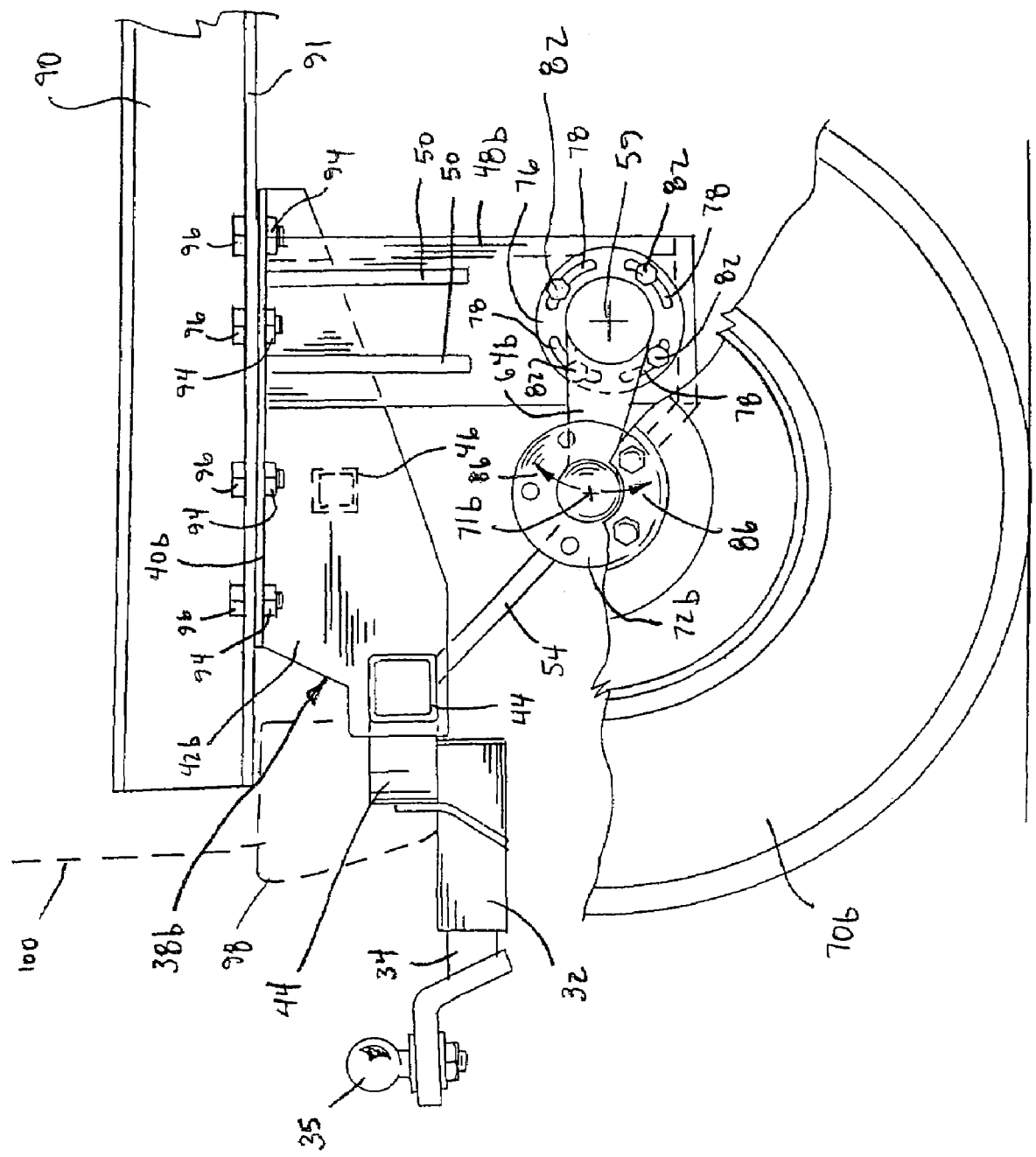
FIG. 3 is a side view of the hitch and axle assembly showing its attachment to the pickup truck chassis.

Support structure is mounted to the underside of chassis 88 of truck 20. As seen in FIGS. 2-4, chassis 88 includes two substantially longitudinal members 90 which each have a lower flange 91. When securing assembly 30 to truck 20, the upper flanges 40a, 40b of longitudinal members 38a, 38b are each brought into abutting contact with the lower flanges 91 of chassis members 90 (FIG. 3). Bolts 96 are then passed through apertures 92 in upper flanges 38a, 38b and through corresponding apertures in lower flanges 91. Nuts 94 are then used to firmly secure flanges 38a, 38b into supporting engagement with lower flanges 91. The use of threaded fasteners such as nuts 94 and bolts 96 allows assembly 30 to be easily detached from truck 20 when it is not needed. If the lower flanges 91 do not include openings or slots through which bolts 96 can be inserted, such apertures can be drilled therethrough or other suitable attachment means may be used to secure support structure 36 to chassis 88.

After support structure 36 has been attached to chassis 88, the rotational position of torsion beam assemblies 60a, 60b can be adjusted as required. The vertical height at which longitudinal members 38a, 38b engage chassis 88 may vary between trucks or vary for a particular truck 20 due to a change in the suspension springs, tires or other part of truck 20. The vertical distance between primary axis 59 and upper flanges 40a, 40b is fixed in the illustrated embodiment and, consequently, it may be necessary to vary the vertical distance between rotational axes 71a, 71b, and primary axis 59 to properly position wheel assemblies 68a, 68b for weight bearing engagement with the ground surface.

As described above slots 78 extend through an arc of approximately 20-30 degrees and this allows torsion beam assemblies 60a, 60b to be adjustably rotated through an arc of similar magnitude. The actual rotational adjustment range of assemblies 60a, 60b will be slightly less than the arc defined by slots 78 due to the shaft thickness of bolt 82. As best seen in FIG. 3, by rotationally adjusting assemblies 60a, 60b, rotational axes 71a, 71b can be adjustably positioned as represented by arrows 86. This rotational adjustment rotates axes 71a, 71b about primary axis 59 and, as oriented in the illustrated embodiment, results primarily in the vertical adjustment of axes 71a, 71b. Once wheel assemblies 68a, 68b have been adjusted to their desired positions, bolts 82/nuts 80 on each lateral side of assembly 30 are tightened to thereby secure assemblies 68a, 68b in their desired positions. This adjustment of wheel assemblies 68a, 68b is most conveniently conducted on a relatively flat level ground surface so that, although the rotational axes 71a, 71b will not remain perfectly aligned after such adjustment, they will be in substantial alignment.

Torsion beam assemblies 60a, 60b act as suspension members for wheel assemblies 68a, 68b respectively. As wheel assemblies 68a, 68b move vertically, they will cause the rotation of lever arms 64a, 64b about primary axis 59. Lever arms 64a, 64b are attached to the outer ends of torsion bars located within the torsion members 62a, 62b. The inner ends of the torsion bars are attached to torsion members 62a, 62b. Consequently, the rotation of lever arms 64a, 64b will apply a torque to the torsion bars within torsion members 62a, 62b which are secured against rotation by mounting plates 76. The torsion bars experience resilient strain as a result of this torque and act as spring members, allowing limited vertical movement of wheel assemblies 68a, 68b, while urging wheel assemblies back toward their neutral position (i.e., the at rest position of torsion members 62a, 62b).

As may be seen in FIGS. 3 and 5, the illustrated embodiment provides an apparatus wherein support structure 36 is attached to chassis 88 below truck bed 24. This configuration does not interfere with the placement of a load in bed 24, and assembly 30 may be used with truck 20 to increase the capacity of truck bed 24 when truck 20 is not being used as a tow vehicle. Assembly 30 may also enhance the capacity of truck bed 24 when truck 20 is being used as a tow vehicle.

Figure 5:
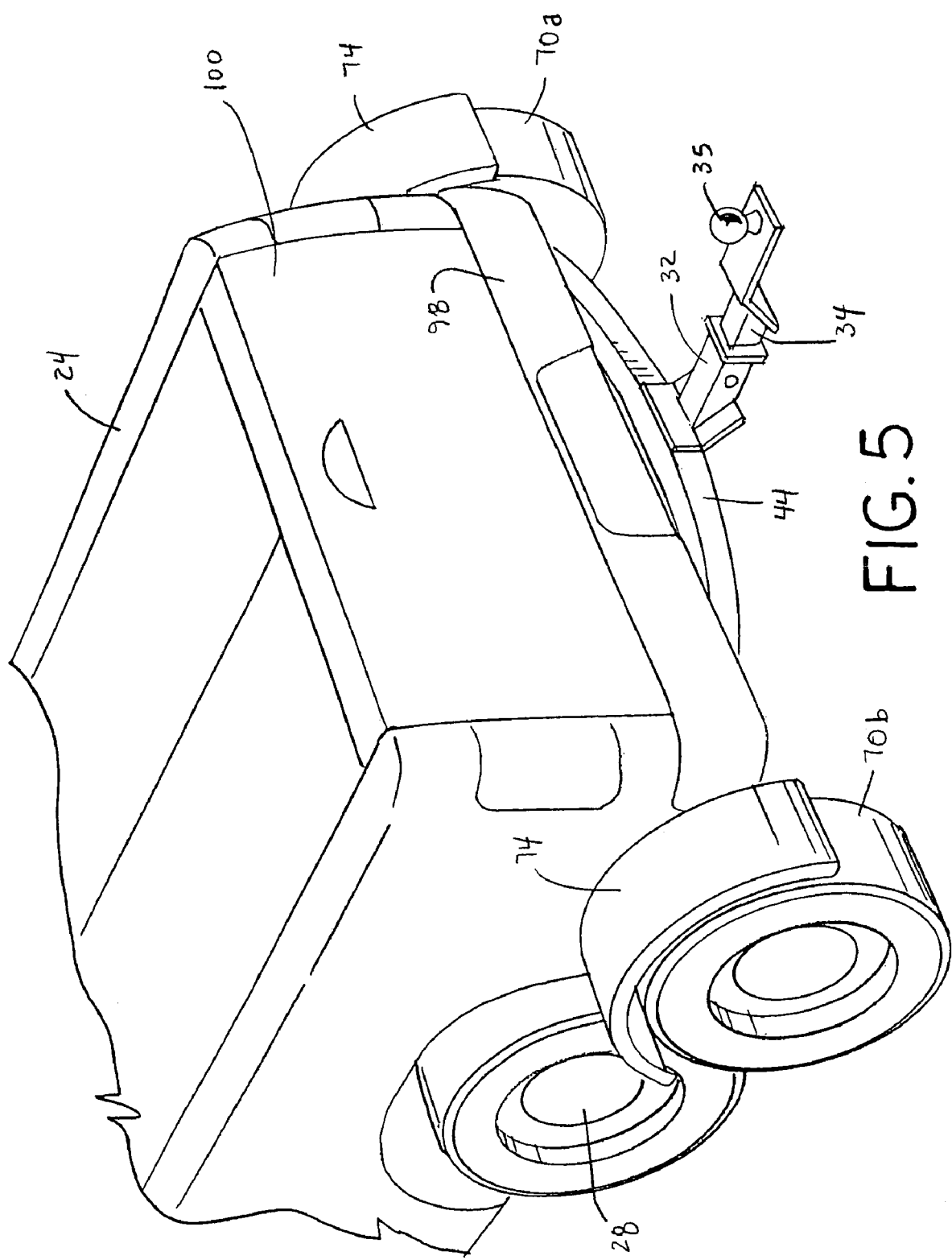
FIG. 5 is a rear perspective view of the pickup truck and attached hitch and axle assembly.

As also seen in FIGS. 3 and 5, wheel assemblies 68a, 68b are located laterally outwardly of truck bed 24 and do not extend rearwardly of rear end 100 of truck 20. This configuration allows hitch ball 35 to be positioned at a location proximate rear bumper 98 that is similar to the typical position of a conventional ball hitch that is mounted directly to a pickup truck. This positioning of the ball hitch proximate rear end 100 can be useful when maneuvering truck 20 in tight spaces where the use of truck with an excessive length could be problematic.

While this invention has been described as having an exemplary design, the present invention may be further modified within the spirit and scope of this disclosure. This application is therefore intended to cover any variations, uses, or adaptations of the invention using its general principles.

What is claimed is:

1. A hitch and axle assembly adapted for use with a vehicle; said assembly comprising:
    a support structure detachably securable to the vehicle;
    a hitch mounted on said support structure; and
    an axle assembly, said axle assembly comprising:
    a primary axle member extending laterally from proximate a first lateral side of said support structure to proximate an opposite second lateral side of said support structure, said primary axle member defining a primary axis;
    a first torsion beam assembly coupled to said primary axle member proximate said first lateral side, said first torsion beam assembly including a first torsion member extending substantially coincident with said primary axis and a first lever arm extending substantially transversely from said first torsion member;
    a first wheel assembly mounted on a distal portion of said first lever arm wherein said first wheel assembly defines a first axis of rotation parallel and spaced from said primary axis;
    a second torsion beam assembly coupled to said primary axle member proximate said second lateral side, said second torsion beam assembly including a second torsion member extending substantially coincident with said primary axis and a second lever arm extending substantially transversely from said second torsion member; and
    a second wheel assembly mounted on a distal portion of said second lever arm wherein said second wheel assembly defines a second axis of rotation parallel and spaced from said primary axis and wherein said first and second axes of rotation are substantially coincident, and said first and second torsion beam assemblies are each rotationally adjustably coupled to said primary axle member wherein rotational adjustment of said first and second torsion beam assemblies rotates said first and second lever arms respectively and thereby selectively adjusts a vertical distance between said primary axis and said first and second axes of rotation respectively.

2. The hitch and axle assembly of claim 1 wherein securement of said support structure to the vehicle disposes said support structure below a chassis of the vehicle, positions said first and second wheel assemblies laterally outwardly of the vehicle and positions said support structure wherein said hitch is mountable at a location proximate a rear end of the vehicle.

3. The hitch and axle assembly of claim 1 wherein said support structure includes a first longitudinally extending member having a first upper flange and a second longitudinally extending member having a second upper flange, said first and second longitudinal members being positioned proximate said first and second lateral sides respectively and wherein each of said first and second upper flanges are supportingly engageable with the vehicle.

4. The hitch and axle assembly of claim 3 further comprising first and second structural plates secured respectively to said first and second longitudinal members and extending downwardly therefrom, said primary axle member extending between and secured to said first and second structural plates.

5. The hitch and axle assembly of claim 4 further comprising a plurality of bracing members extending laterally between said first and second structural plates.

6. The hitch and axle assembly of claim 4 wherein said first and second torsion beam assemblies are coupled to said primary axle member by said first and second structural plates respectively, and said first and second torsion beam assemblies are rotationally adjustably mounted on said first and second structural plates respectively.

7. A pickup pick-up truck assembly comprising:
    a vehicle including a chassis and a truck bed;
    a support structure detachably securable to said chassis;
    a hitch mountable on said support structure; and
    an axle assembly, said axle assembly comprising:
    a primary axle member extending laterally from proximate a first lateral side of said support structure to proximate an opposite second lateral side of said support structure, said primary axle member defining a primary axis;
    a first torsion beam assembly coupled to said primary axle member proximate said first lateral side, said first torsion beam assembly including a first torsion member extending substantially coincident with said primary axis and a first lever arm extending substantially transversely from said first torsion member;
    a first wheel assembly mounted on a distal portion of said first lever arm wherein said first wheel assembly defines a first axis of rotation parallel and spaced from said primary axis;
    a second torsion beam assembly coupled to said primary axle member proximate said second lateral side, said second torsion beam assembly including a second torsion member extending substantially coincident with said primary axis and a second lever arm extending substantially transversely from said second torsion member; and
    a second wheel assembly mounted on a distal portion of said second lever arm wherein said second wheel assembly defines a second axis of rotation parallel and spaced from said primary axis and wherein said first and second axes of rotation are substantially coincident, and said first and second torsion beam assemblies are each rotationally adjustably coupled to said primary axle member wherein rotational adjustment of said first and second torsion beam assemblies rotates said first and second lever arms respectively and thereby adjusts a vertical distance between said primary axis and said first and second axes of rotation respectively.

8. The pick-up truck assembly of claim 7 wherein securement of said support structure to said chassis disposes said support structure below said truck bed, positions said first and second wheel assemblies laterally outwardly of said truck bed and positions said support structure wherein said hitch is mountable at a location proximate a rear end of said truck bed.

9. The pick-up truck assembly of claim 7 wherein said support structure includes a first longitudinally extending member having a first upper flange and a second longitudinally extending member having a second upper flange, said first and second longitudinal members being positioned proximate said first and second lateral sides respectively and wherein each of said first and second upper flanges are supportingly engageable with said chassis.

10. The pick-up truck assembly of claim 9 wherein a plurality of threaded fasteners detachably secure said first and second upper flanges to said chassis.

11. The pick-up truck assembly of claim 9 further comprising first and second structural plates secured respectively to said first and second longitudinal members and extending downwardly therefrom, said primary axle member extending between and secured to said first and second structural plates.

12. The pick-up truck assembly of claim 11 further comprising a plurality of bracing members extending laterally between said first and second structural plates.

13. The pick-up truck assembly of claim 11 wherein said first and second torsion beam assemblies are coupled to said primary axle member by said first and second structural plates respectively, and said first and second torsion beam assemblies are rotationally adjustably mounted on said first and second structural plates respectively.

* * * * *